(12) United States Patent
West et al.

(10) Patent No.: US 11,964,515 B2
(45) Date of Patent: *Apr. 23, 2024

(54) INTEGRATED TREAD WEAR SENSOR AND TPMS CONTAINER FOR A TIRE

(71) Applicant: The Goodyear Tire & Rubber Company, Akron, OH (US)

(72) Inventors: Jeffrey McKay West, Uniontown, OH (US); Arun Kumar Byatarayanapura Gopala, Copley, OH (US); Michael William Kestner, Canton, OH (US); Junling Zhao, Hudson, OH (US); Peter Jung-min Suh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 296 days.

This patent is subject to a terminal disclaimer.

(21) Appl. No.: 17/550,179

(22) Filed: Dec. 14, 2021

(65) Prior Publication Data

US 2022/0185033 A1    Jun. 16, 2022

Related U.S. Application Data

(60) Provisional application No. 63/125,435, filed on Dec. 15, 2020, provisional application No. 63/125,455, filed on Dec. 15, 2020.

(51) Int. Cl.
*B60C 11/24* (2006.01)
*B60C 23/04* (2006.01)

(52) U.S. Cl.
CPC ........ *B60C 11/246* (2013.01); *B60C 23/0493* (2013.01)

(58) Field of Classification Search
CPC .. B60C 11/246; B60C 23/0493; B60C 11/243
(Continued)

(56) References Cited

U.S. PATENT DOCUMENTS

| 6,443,198 B1 | 9/2002 | Koch et al. |
| 6,444,069 B1 | 9/2002 | Koch et al. |

(Continued)

FOREIGN PATENT DOCUMENTS

| DE | 19745734 A1 | 4/1999 |
| DE | 20216290 U1 | 1/2003 |

(Continued)

OTHER PUBLICATIONS

Extended Search Report issued in the corresponding European application received by Applicant on May 12, 2023.

*Primary Examiner* — Eric Blount
(74) *Attorney, Agent, or Firm* — Edward T. Kennedy (57) ABSTRACT

An integrated tread wear sensor and tire pressure monitoring system sensor unit container for a tire includes a tread wear sensor plug and a sensor container. The tread wear sensor plug includes a cylindrical projection extending through an opening formed in a selected tread element of the tire. A flange extends outwardly from the projection and includes a contact surface that is mounted to an innerliner of the tire. A conductive wire is disposed in the tread wear sensor plug and includes proximal ends disposed in the flange and a distal end disposed near a radially outer surface of the projection. The sensor container includes a wall extending radially from the flange of the tread wear sensor plug and terminating in a lip. A container cavity is defined by the flange, the wall, and the lip, and receives a tire pressure monitoring system sensor.

15 Claims, 6 Drawing Sheets

(58) Field of Classification Search
USPC .......................................................... 340/442
See application file for complete search history.

(56) References Cited

U.S. PATENT DOCUMENTS

| | | |
|---|---|---|
| 6,546,982 B1 | 4/2003 | Brown et al. |
| 6,885,291 B1 | 4/2005 | Pollack et al. |
| 6,889,153 B2 | 5/2005 | Dietiker |
| 7,280,036 B2 | 10/2007 | Kafrawy |
| 8,596,117 B2 | 12/2013 | Wilson et al. |
| 9,016,118 B2 | 4/2015 | Townsend et al. |
| 9,283,817 B2 | 3/2016 | Sandstrom et al. |
| 9,352,615 B2 | 5/2016 | Djelloul-mazouz et al. |
| 9,649,889 B2 | 5/2017 | Engel et al. |
| 11,639,077 B2 * | 5/2023 | Gau .................... B60C 23/0493 73/146 |
| 2022/0185029 A1 | 6/2022 | Gau et al. |
| 2022/0185030 A1 | 6/2022 | Zhao et al. |
| 2022/0185031 A1 | 6/2022 | Zhao et al. |

FOREIGN PATENT DOCUMENTS

| | | |
|---|---|---|
| DE | 102007001279 A1 | 7/2008 |
| DE | 102010000003 A1 | 7/2011 |
| JP | 2005-028950 A | 2/2005 |

\* cited by examiner

INTEGRATED TREAD WEAR SENSOR AND TPMS CONTAINER FOR A TIRE

FIELD OF THE INVENTION

The invention relates to vehicle tires. More particularly, the invention relates to vehicle tires with sensors that determine various conditions within the tires. Specifically, the invention is directed to an integrated tread wear sensor and tire pressure monitoring system (TPMS) sensor unit container for a tire.

BACKGROUND OF THE INVENTION

In the manufacture of a pneumatic tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

The use of tread wear indicators that are formed on a tire tread before or after curing is known in the art. For example, prior art mechanical tread wear indicators include color indicia disposed below certain tread elements, tie bars disposed in the tread grooves, or characters formed in the tread elements, all of which provide a visual indicator of wear. Such mechanical indicators may be difficult for a vehicle operator to see, and thus do not easily provide information to the operator.

In addition, it is often desirable to collect electronic data for the wear state of the tire. The data can be communicated to electronic systems of the vehicle, such as vehicle stability and/or braking systems, in order to provide improved control of the vehicle and to monitor or track driving behavior. Mechanical tread wear indicators are not able to provide such data to electronic systems of the vehicle.

To provide an indication of tire wear to vehicle electronic systems, prior art indirect wear estimation techniques were developed. Such techniques involve estimation of tire wear through certain tire and vehicle parameters, rather than direct measurement of wear. For example, tire pressure, tire temperature, vehicle speed, vehicle mileage, vehicle acceleration and other parameters may be employed to estimate tire wear. Such indirect estimation of tire wear can be difficult to perform accurately, and typically involves complex modeling techniques.

In order to provide a wear indication to vehicle electronic systems based on a direct measurement of tire wear, prior art electronic wear sensors were developed. Such sensors are known in the art as direct wear sensors, as they attempt to directly measure tire wear, rather than providing an estimate from indirect means. By way of example, prior art direct wear sensors include resistance-based electronic sensors that typically are incorporated into tread elements of tires. As the tread element wears, resistors in the sensor also wear, leading to a change in the electrical resistance of the sensor. By measuring the resistance of the sensor and transmitting the measured resistance data to a processor, wear of the tread can be determined.

While prior art direct wear sensors are acceptable for their intended purpose, many such sensors are difficult to install in the tire. Other direct wear sensors cannot withstand the harsh operating environment of the tire for a prolonged period, such as the recommended life of the tire. Still other direct wear sensors are not capable of maintaining precise and repeatable indication of tire wear over the recommended life of the tire.

In addition, it is desirable to electrically connect a direct wear sensor to a sensor unit that includes an antenna for wirelessly transmitting data and/or a signal to a receiver unit for processing and/or storage. For example, a direct wear sensor may be electrically connected to a tire pressure monitoring system (TPMS) sensor unit. Many TPMS sensor units are equipped with a rigid housing that encases the antenna and other components. To ensure optimum operation of the TPMS sensor unit, correct placement and orientation of the sensor housing is important. Moreover, a secure electrical connection between the direct wear sensor and the TPMS sensor unit is desirable.

As a result, there is a need for a structure for a tire that provides a secure electrical connection between a tread wear sensor and a TPMS sensor unit, and which also provides correct placement and orientation of the TPMS sensor unit.

SUMMARY OF THE INVENTION

According to an aspect of an exemplary embodiment of the invention, an integrated tread wear sensor and tire pressure monitoring system sensor unit container for a tire is provided. The integrated tread wear sensor and tire pressure monitoring system sensor unit container includes a tread wear sensor plug. The tread wear sensor plug includes a cylindrical projection extending through an opening formed in a selected tread element of the tire. A flange extends outwardly from the projection and includes a contact surface that is mounted to an innerliner of the tire. A conductive wire is disposed in the tread wear sensor plug and includes proximal ends disposed in the flange and a distal end disposed near a radially outer surface of the projection. The integrated tread wear sensor and tire pressure monitoring system sensor unit container also includes a sensor container. The sensor container includes a wall extending radially from the flange of the tread wear sensor plug, which terminates in a lip. A container cavity is defined by the flange, the wall, and the lip, and receives a tire pressure monitoring system sensor.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"CAN bus" is an abbreviation for controller area network.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cloud computing" or "cloud" means computer processing involving computing power and/or data storage that is distributed across multiple data centers, which is typically facilitated by access and communication using the Internet.

"Equatorial plane" means the plane perpendicular to the axis of rotation of the tire and passing through the center of the tire tread.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Innerliner" means the layer or layers of elastomer or other material that form the inside surface of a tubeless tire and that contain the inflating fluid within the tire.

"Lateral" means an axial direction.

"Lateral edges" means a line tangent to the axially outermost tread contact patch or footprint as measured under normal load and tire inflation, the lines being parallel to the equatorial plane.

"Outboard side" means the side of the tire farthest away from the vehicle when the tire is mounted on a wheel and the wheel is mounted on the vehicle.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"TPMS" means a tire pressure monitoring system, which is an electronic system that measures the internal pressure of a tire and is capable of communicating the pressure to a processor that is in electronic communication with electronic systems of the vehicle.

"Tread element" or "traction element" means a rib or a block element defined by a shape having adjacent grooves.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

Figure 1:
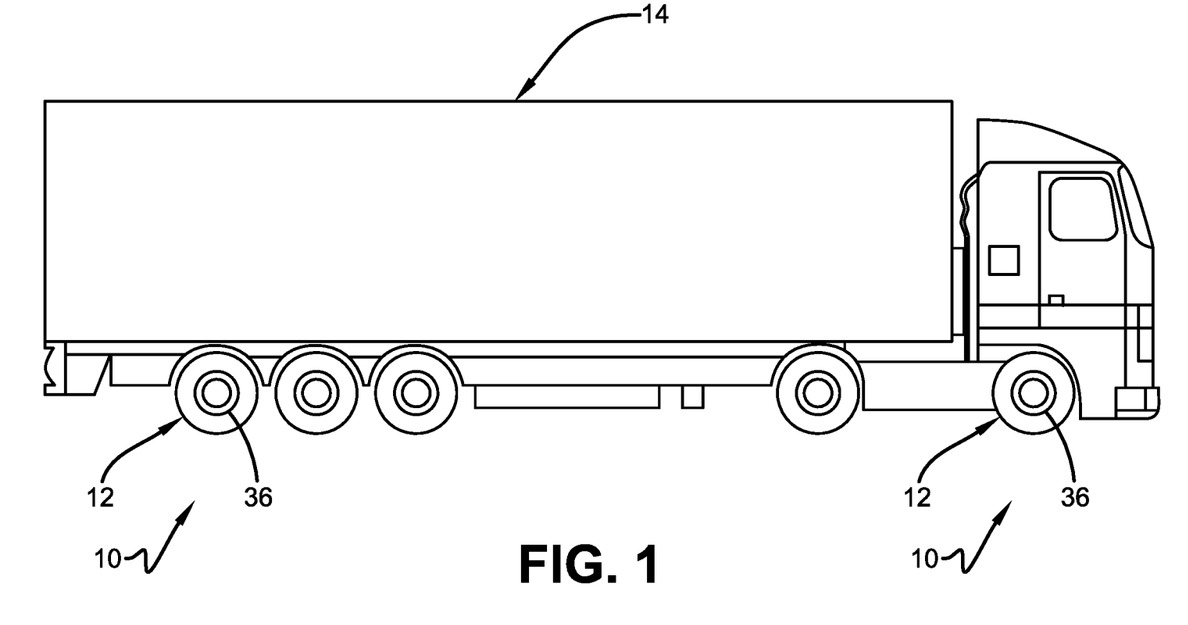
FIG. 1 is a schematic side view of a vehicle with tires that include an exemplary embodiment of an integrated tread wear sensor and TPMS sensor unit container for a tire of the present invention.

An exemplary embodiment of an integrated tread wear sensor and TPMS sensor unit container for a tire of the present invention is indicated at 10 in FIGS. 1 through 8. The integrated tread wear sensor and TPMS sensor unit container 10 is employed in a tire 12. With particular reference to FIG. 1, one or more tires 12 supports a vehicle 14. While the vehicle 14 is depicted as a commercial truck, the invention is not to be so restricted. The principles of the invention find application in other vehicle categories, such as passenger vehicles, off-the-road vehicles and the like, in which vehicles may be supported by more or fewer tires than shown in FIG. 1.

Figure 2:
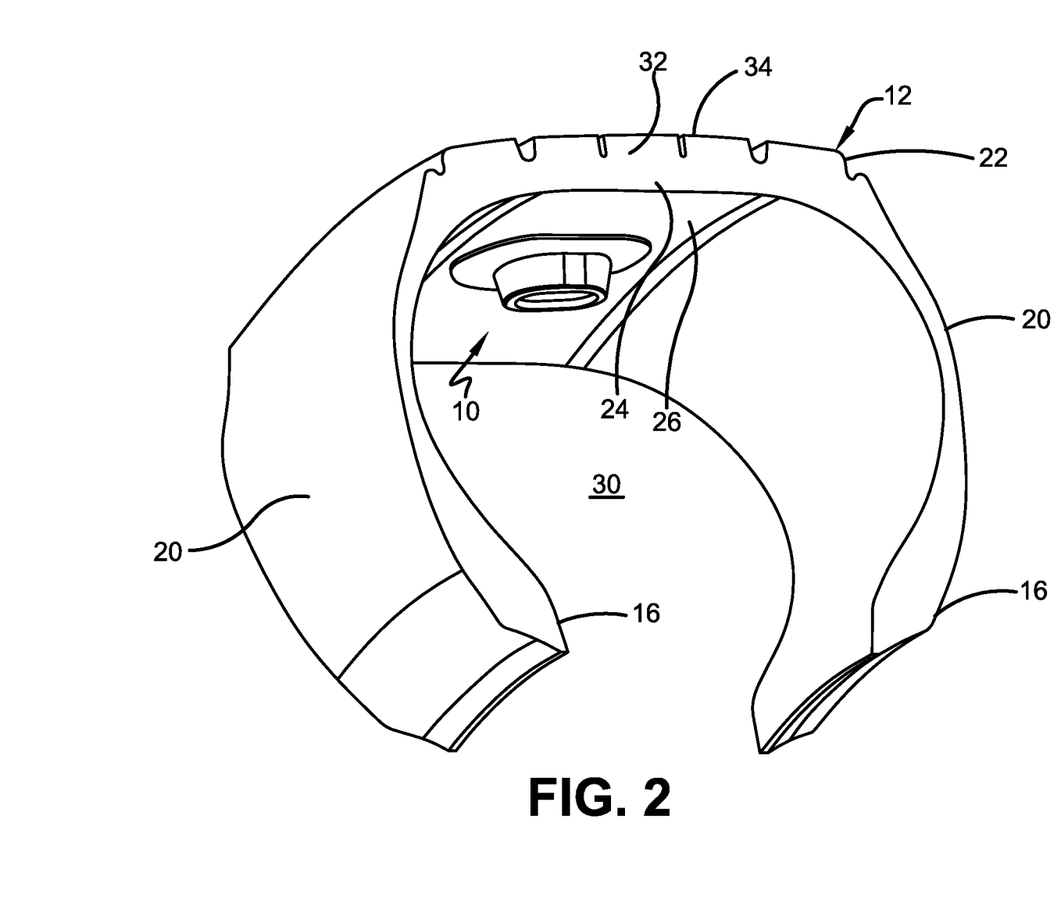
FIG. 2 is a perspective cross-sectional view of a tire shown in FIG. 1, after installation of the integrated tread wear sensor and TPMS sensor unit container.

Turning to FIG. 2, each tire 12 includes a pair of bead areas 16. Each one of a pair of sidewalls 20 extends radially outwardly from a respective bead area 16 to a ground-contacting tread 22. The tread 22 is formed with multiple tread elements or tread blocks 32 and includes a radially outer surface 34. The tire 12 is reinforced by a carcass 24 that toroidally extends from one bead area 16 to the other bead area, as known to those skilled in the art. An innerliner 26 is formed on the inner or inside surface of the carcass 24. The tire 12 is mounted on the flange of a wheel or rim 36 (FIG. 1) as known in the art, forming an internal cavity 30.

Figure 7:
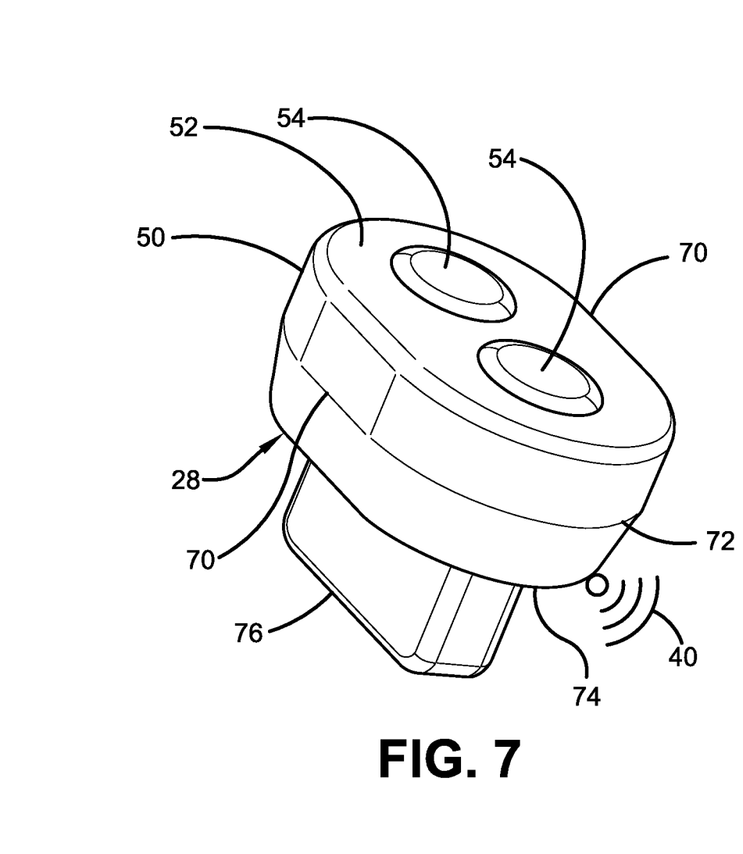
FIG. 7 is an enlarged perspective view of a TPMS sensor unit employed with the tire and integrated tread wear sensor and TPMS sensor unit container shown in FIG. 2.

With additional reference to FIG. 7, a sensor unit 28 preferably is mounted to the tire 12. The sensor unit 28 detects certain real-time parameters of the tire 12, and preferably includes a pressure sensor to sense the inflation pressure within a cavity 30 of the tire, and may include a temperature sensor to sense the temperature of the tire and/or the temperature in the cavity. The sensor unit 28 may be a commercially-available tire pressure monitoring system (TPMS) module or sensing unit, and will be referred to as a TPMS sensor unit.

The TPMS sensor unit 28 preferably also includes a processor and memory to store tire identification (ID) information for each specific tire 12. For example, the tire ID may include manufacturing information for the tire 12, including: the tire model; size information, such as rim size, width, and outer diameter; manufacturing location; manufacturing date; a treadcap code that includes or correlates to a compound identification; and a mold code that includes or correlates to a tread structure identification. The tire ID may also include a service history or other information to identify specific features and parameters of each tire 12.

The TPMS sensor unit 28 preferably further includes an antenna for wirelessly transmitting 40 measured parameters and tire ID data to a remote processor for analysis, such as a processor integrated into a vehicle electronic control unit and/or CAN bus, or a remote processor, such as a cloud computing processor. The TPMS sensor unit 28 includes a rigid housing 50 formed with a base 52. A pair of electrical contacts 54 are mounted on the base 52 and extend through the housing 50.

The housing 50 of the TPMS sensor unit 28 preferably is formed with an oval shape. Thus, the housing 50 includes a pair of elongated sides 70 extending parallel to one another, and a pair of ends 72 that extend parallel to one another, and which are shorter than the sides 70. The housing 50 also includes a top 74 opposite the base 52, and a protrusion 76 extending radially from the top away from the housing. The protrusion 76 preferably is formed with a rectangular cross section, which enables a technician to grip the TPMS sensor unit 28. The TPMS sensor unit 28 is mounted to the tire 12 in a manner that will be described below.

Figure 3:
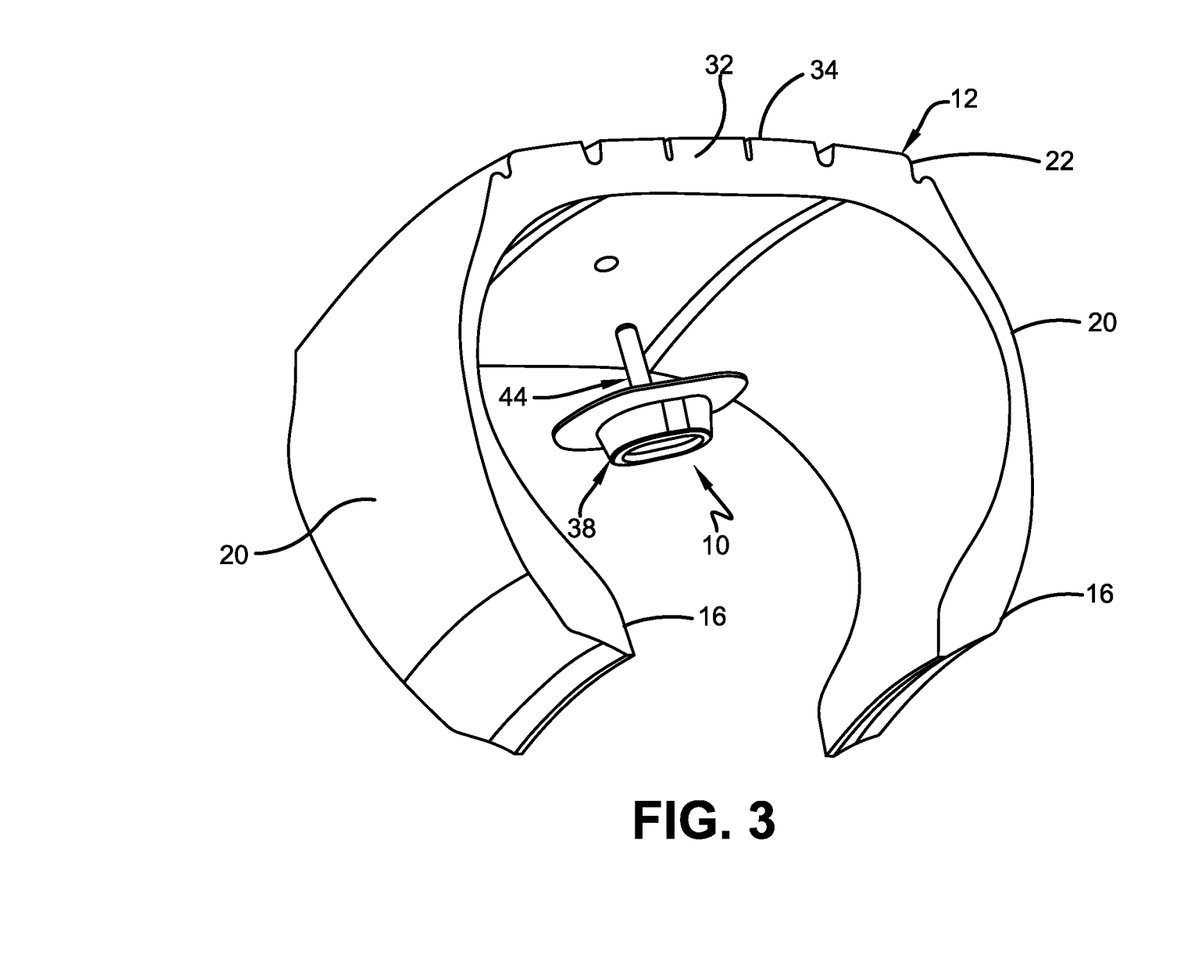
FIG. 3 is a perspective cross-sectional view of a tire shown in FIG. 1, prior to installation of the integrated tread wear sensor and TPMS sensor unit container.
Figure 4:
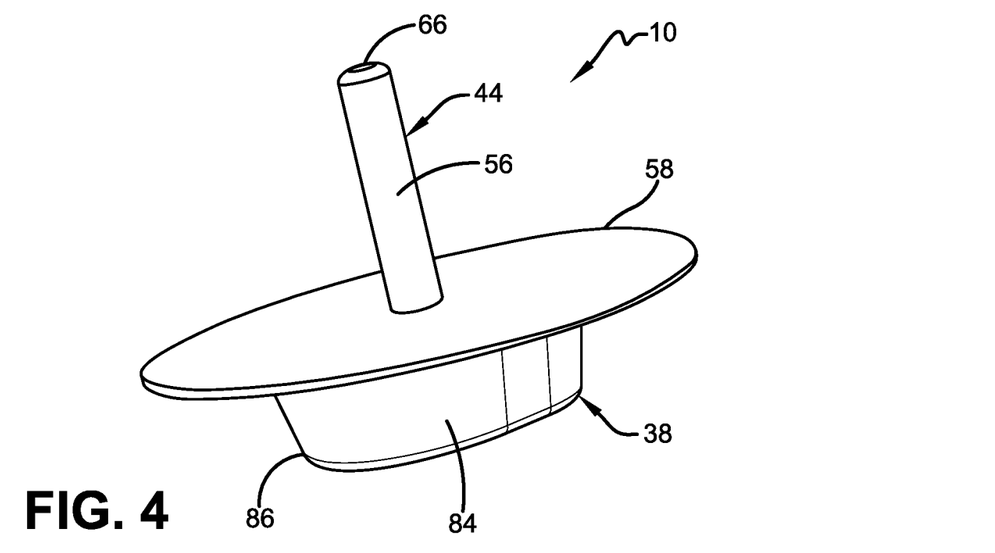
FIG. 4 is an enlarged perspective view of the integrated tread wear sensor and TPMS sensor unit container shown in FIG. 3.
Figure 5:
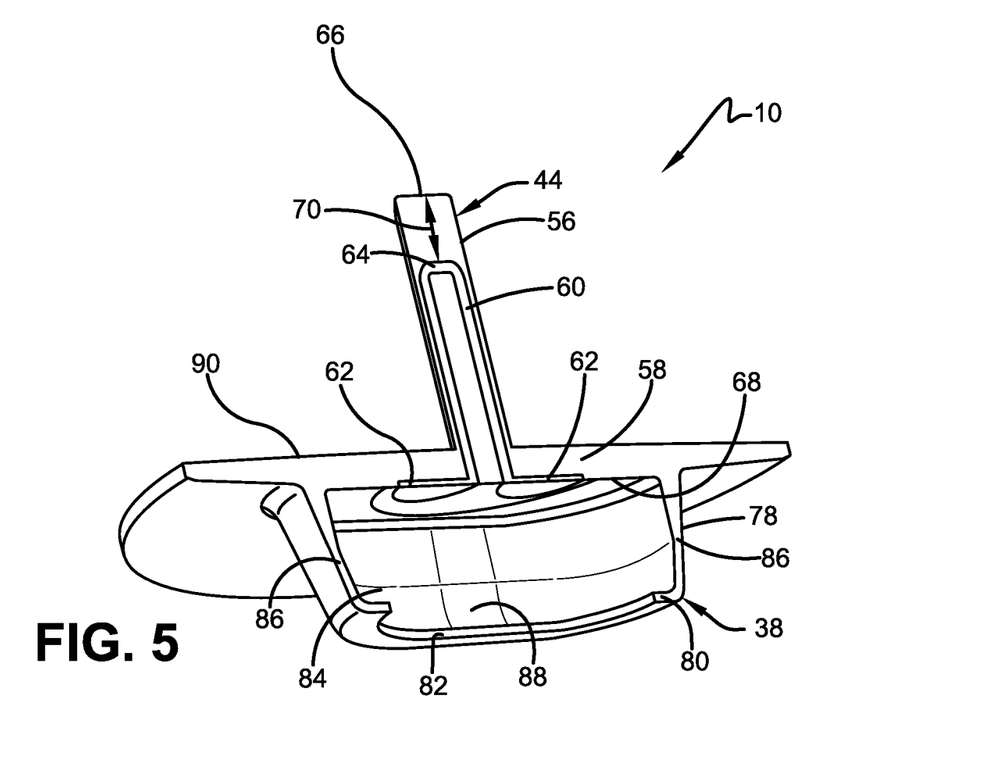
FIG. 5 is a cross-sectional perspective view of the integrated tread wear sensor and TPMS sensor unit container shown in FIG. 4.

With reference to FIGS. 3-5, the integrated tread wear sensor and TPMS sensor unit container 10 includes a tread wear sensor plug 44. The tread wear plug 44 includes a cylindrical projection 56 and a flange 58. The flange 58 extends outwardly from the projection 56 to provide a base for the tread wear plug 44. A conductive wire 60 is disposed in the tread wear plug 44. The wire 60 preferably is an insulated wire, but may be an uninsulated wire, depending on particular design considerations. The wire is formed in a U-shape and thus has proximal ends 62 disposed in the flange 58 and a distal end 64 disposed near a radially outer surface 66 of the projection 56. The proximal ends 62 of the wire 60 extend to a bottom 68 of the flange 58 to contact the electrical contacts 54 of the TPMS sensor unit 28, as will be described below. The distal end 64 of the wire 60 is disposed at a set distance 70 below the radially outer surface 66 of the projection 56.

Figure 6:
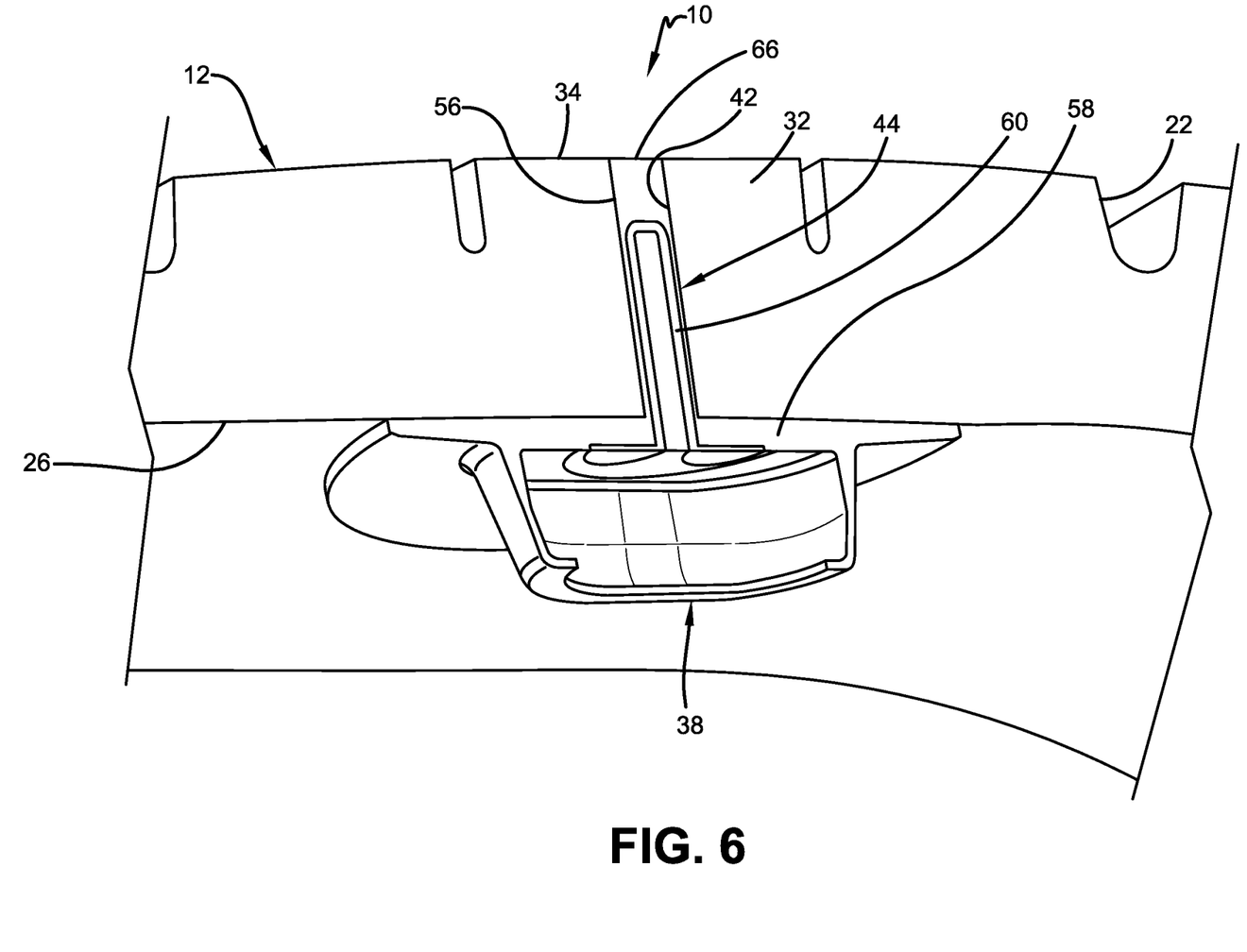
FIG. 6 is an enlarged cross-sectional perspective view of a portion of the tire and integrated tread wear sensor and TPMS sensor unit container shown in FIG. 2.

As shown in FIG. 6, an opening 42 for the tread wear plug 44 is formed in a selected tread element 32. The opening 42 passes radially from the internal cavity 30 of the tire 12 to the radially outer surface 34 of the tread 22. The opening 42 may be formed by drilling, water jet cutting, laser cutting, and the like. The tread wear plug 44 preferably is installed in the tire 12 before the tire is mounted on the wheel 36. The projection 56 of the tread wear plug 44 is inserted from the direction of the cavity 30 through the opening 42 in the tread element 32, with the projection outer surface 66 being flush with the tread element outer surface 34. Preferably, the projection 56 is formed of a material that includes mechanical properties, such as shear modulus, which are similar to those of the material of the tread 22. Such similarity enables the projection 56 of the tread wear plug 44 to behave like a compatible plug in the tread element 32.

Returning to FIG. 5, the integrated tread wear sensor and TPMS sensor unit container 10 also includes a sensor container 38. The TPMS sensor unit 28 may be mounted to the tire 12 using the container 38, which receives the sensor unit and enables the TPMS sensor unit to easily be removed and replaced when needed. Preferably, the container 38 is flexible and is formed of an elastomer or polymer. The flange 58 of the tread wear plug 44 acts as the base of the sensor container 38, and provides a positive mechanical stop for the tread wear plug when it is inserted into the opening 42 in the tread element 32. The flange 58 also provides a seal to prevent air from flowing out of the tire cavity 30 through the opening 42.

The flange 58 preferably is formed with a circular shape or an oval shape, and with a wall 78 extending radially from the base. The wall 78 terminates in a lip 80, which defines an opening 82. The wall 78 preferably is formed with an oval shape, and includes a pair of elongated sides 84 extending parallel to one another, and a pair of ends 86 extending parallel to one another, which are shorter than the sides. In this manner, the shape of the container wall 78 corresponds to and cooperates with the shape of the TPMS sensor housing 50.

The flange 58, wall 78 and lip 80 cooperate to define a container cavity 88, which receives and secures the TPMS sensor unit 28. The TPMS sensor unit 28 is inserted into the container cavity 88 of the container 38 through the opening 82. Because the container 38 is formed of a flexible material, the wall 78 and lip 80 flex to allow insertion of the TPMS sensor unit 28 through the opening 82, and then secure the TPMS sensor unit in the container cavity 88. As mentioned above, the oval shape of the container wall 78 cooperates with the oval shape of the TPMS sensor housing 50. Because the oval-shaped sensor housing 50 securely seats in the container cavity 88, which is defined by the oval-shaped sensor wall 78, the orientation of the TPMS sensor unit 28 is secured and maintained, thereby minimizing rotation of the TPMS sensor unit relative to the innerliner 26 during vehicle operation.

The flexible elastomer or polymer material of the container 38 ensures that the container retains the TPMS sensor unit 28 and maintains electrical contact between the tread wear plug 44 and the TPMS sensor unit. The protrusion 46 on the TPMS sensor unit 28 enables the TPMS sensor unit to be manually adjusted or rotated in the container cavity 88 to ensure alignment of the electrical contacts 54 with the proximal ends 62 of the wire 60 of the tread wear plug 44. The flange 58 is formed with a contact surface 90, which contacts and is secured to the innerliner 26. Preferably, the contact surface 90 of the flange 58 is attached to the innerliner 26 by an adhesive, thereby securing the integrated tread wear sensor and TPMS sensor unit container 10 to the tire 12.

Figure 8:
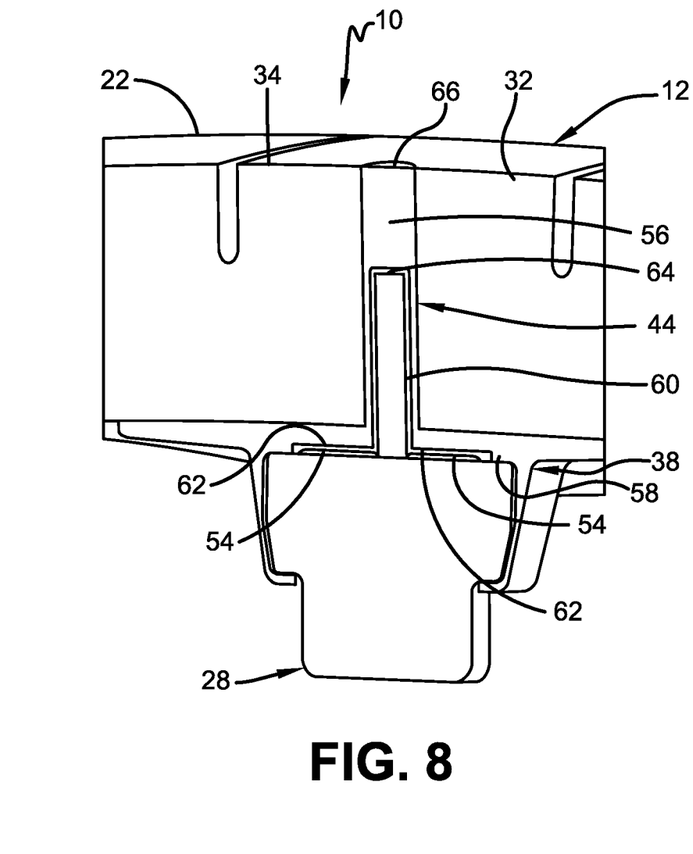
FIG. 8 is a cross-sectional perspective view of a portion of the tire and integrated tread wear sensor and TPMS sensor unit container shown in FIG. 6, with the TPMS sensor unit installed.

Turning to FIG. 8, operation of the integrated tread wear sensor and TPMS sensor unit container 10 tire is shown. The tread wear plug 44 is installed in the tire 12, and the projection outer surface 66 is flush with the tread element outer surface 34. A continuous electrical circuit is formed by the wire 60 and the contact of each proximal wire end 62 with each respective electrical contact 54 of the TPMS sensor unit 28. The distal end 64 of the wire 60 is disposed at the predetermined distance 70 (FIG. 5) below the radially outer surface 66 of the projection 56, which corresponds to a minimum recommended tread depth.

As the tread 22 wears, the projection 56 of the wear plug 44 also wears. When the tread 22 and the projection 56 wear down to the wire 60, the distal end 64 of the wire 60 breaks, creating a break in the electrical circuit formed by the wire and the contact of each proximal wire end 62 with each respective sensor unit electrical contact 54. The sensor unit 28 senses the break in the electrical circuit, and wirelessly transmits 40 a notice that the electrical circuit has broken and/or that the minimum recommended tread depth has been reached. The notice transmitted 40 by the sensor unit 28 may be sent to a remote processor, which may be integrated into a vehicle electronic control unit, CAN bus, and/or a cloud-based server. The notice thus provides an indication when replacement or retreading of the tire 12 should take place.

In this manner, the integrated tread wear sensor and TPMS sensor unit container 10 provides a single structure for the tire 12 that enables a secure electrical connection between the tread wear sensor plug 44 and the TPMS sensor unit 28. The container 38 of the integrated tread wear sensor and TPMS sensor unit container 10 also provides correct placement and orientation of the TPMS sensor unit 28.

The present invention also includes a method of using an integrated tread wear sensor and TPMS sensor unit container 10. The method includes steps in accordance with the description that is presented above and shown in FIGS. 1 through 8.

It is to be understood that the structure of the above-described integrated tread wear sensor and TPMS sensor unit container 10 may be altered or rearranged, or components or steps known to those skilled in the art omitted or added, without affecting the overall concept or operation of the invention. For example, a single tread wear plug 44 may be disposed in the tread 22 of the tire 12, or multiple tread wear plugs may be disposed in the tread about the tire. In addition, the tread wear plug 44 may be inserted into the tread element 32 before or after curing of the tire 12. Furthermore, the tread wear plug 44 may include multiple wires 60, each one having a distal end 64 spaced apart from the other wires, which enables the tread wear plug to indicate different wear states of the tread 22, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. An integrated tread wear sensor and tire pressure monitoring system sensor unit container for a tire including:
   a tread wear sensor plug, the tread wear sensor plug including:
      a cylindrical projection extending through an opening formed in a selected tread element of the tire;
      a flange extending outwardly from the projection, the flange including a contact surface being mounted to an innerliner of the tire; and
      a conductive wire disposed in the tread wear sensor plug, the wire including proximal ends disposed in the flange and a distal end disposed near a radially outer surface of the projection; and
   a sensor container, the sensor container including:
      a wall extending radially from the flange of the tread wear sensor plug, the wall terminating in a lip; and
      a container cavity defined by the flange, the wall, and the lip, the cavity receiving a tire pressure monitoring system sensor.

2. The integrated tread wear sensor and tire pressure monitoring system sensor unit container for a tire of claim 1, wherein the wall of the sensor container is formed with an oval shape that cooperates with a shape of a housing of the tire pressure monitoring system sensor.

3. The integrated tread wear sensor and tire pressure monitoring system sensor unit container for a tire of claim 1, wherein the sensor container is formed with an opening for removable mounting of the tire pressure monitoring system sensor unit to the tire.

4. The integrated tread wear sensor and tire pressure monitoring system sensor unit container for a tire of claim 3, wherein the sensor container wall and lip are formed of a flexible material that flex to allow insertion and removal of the tire pressure monitoring system sensor unit.

5. The integrated tread wear sensor and tire pressure monitoring system sensor unit container for a tire of claim 1, wherein the radially outer surface of the projection is flush with a radially outer surface of the selected one of the tread elements.

6. The integrated tread wear sensor and tire pressure monitoring system sensor unit container for a tire of claim 1, wherein the distal end of the wire is disposed at a set distance below the radially outer surface of the projection, the distance corresponding to a minimum recommended tread depth.

7. The integrated tread wear sensor and tire pressure monitoring system sensor unit container for a tire of claim 1, wherein the projection is formed of a material that includes mechanical properties which are similar to mechanical properties of a material of the tread.

8. The integrated tread wear sensor and tire pressure monitoring system sensor unit container for a tire of claim 1, wherein the flange includes at least one of a circular shape and an oval shape.

9. The integrated tread wear sensor and tire pressure monitoring system sensor unit container for a tire of claim 1, wherein the contact surface of the flange is mounted to the innerliner by an adhesive.

10. The integrated tread wear sensor and tire pressure monitoring system sensor unit container for a tire of claim 1, wherein the flange provides a positive mechanical stop for the tread wear sensor plug against the tire.

11. The integrated tread wear sensor and tire pressure monitoring system sensor unit container for a tire of claim 1, wherein the tire pressure monitoring system sensor unit includes a pair of electrical contacts, and an electrical circuit is formed by each proximal end of the wire electrically contacting a respective one of the sensor unit electrical contacts.

12. The integrated tread wear sensor and tire pressure monitoring system sensor unit container for a tire of claim 11, further comprising a notice transmitted by the tire pressure monitoring system sensor unit when the distal end of the wire breaks, creating a break is in the electrical circuit.

13. The integrated tread wear sensor and tire pressure monitoring system sensor unit container for a tire of claim 12, wherein the notice is transmitted to a remote processor.

14. The integrated tread wear sensor and tire pressure monitoring system sensor unit container for a tire of claim 13, wherein the remote processor is integrated into at least one of a vehicle electronic control unit, a controlled area network bus, and a cloud-based server.

15. The integrated tread wear sensor and tire pressure monitoring system sensor unit container for a tire of claim 1, wherein the tread wear sensor plug further comprises multiple wires, wherein each wire includes a distal end that is spaced apart from the other wires.

* * * * *